Nov. 24, 1953     L. T. DAIGLE     2,660,291

TROLLEY CONVEYER

Filed Aug. 9, 1952

INVENTOR.
LEO T. DAIGLE
BY
*Robert A. Sloman*
ATTORNEY.

Patented Nov. 24, 1953

2,660,291

UNITED STATES PATENT OFFICE 2,660,291

TROLLEY CONVEYER

Leo T. Daigle, Detroit, Mich., assignor to Cable-Link Corporation, Detroit, Mich., a corporation of Michigan Application August 9, 1952, Serial No. 303,546

5 Claims. (Cl. 198—177)

This invention relates to conveyors; and the present application is a continuation in part of my copending application Serial Number 299,413, filed July 17, 1952, relating to a Conveyor.

More particularly, the present invention relates to a novel conveyor construction together with mechanism for conveying around a curve.

It is the object of the present invention to provide a novel conveyor device together with means for guiding the conveyor around curves.

It is the further object of this invention to provide a novel guide mechanism in conjunction with the supporting I beam which will not only guide the conveyor mechanism in its movement around curves, but will also retain the longitudinally movable cable in the desired shape corresponding generally to the shape of the curve in the supporting beam structure.

It is the further object of this invention to provide a novel and simplified conveyor mechanism which is particularly useful throughout the curved portions of a conveyor arrangement.

These and other objects will be seen from the following specification and claims in conjunction with the appended drawing in which:

It will be understood that the above drawing illustrates merely a preferred embodiment of the invention, and that other embodiments are contemplated within the scope of the claims hereafter set forth.

Figure 1:
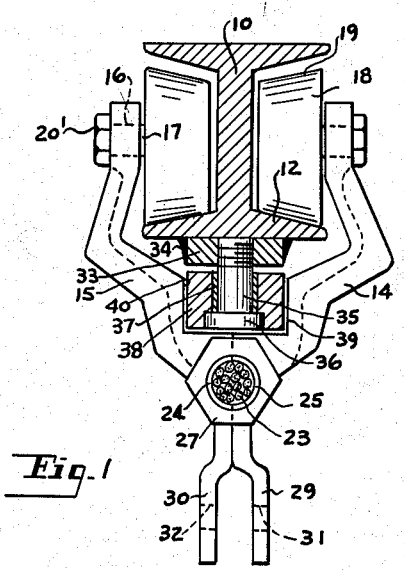
Fig. 1 is an end elevational view of the present conveyor mechanism with a portion thereof in section.

Referring to the drawing, the present conveyor mechanism includes or is associated with an I beam 11 having the downwardly tapered flanges 12 upon opposite sides as indicated in Fig. 1.

Figure 3:
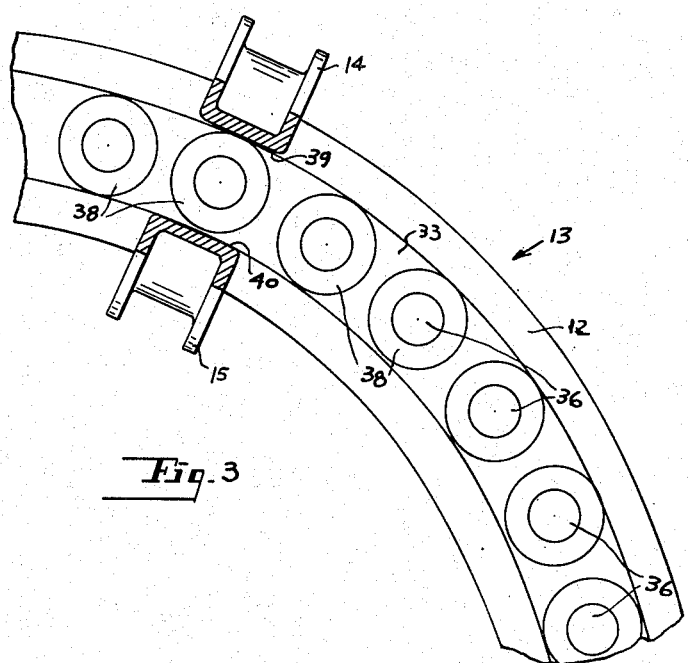
Fig. 3 is a section taken on line 3—3 of Fig. 2.

Fig. 3 generally indicates at 13 the curved portion of the I beam to which the present invention is adapted.

The movable portion of the conveyor mechanism includes a pair of spaced opposed upright arms 14 and 15, transversely apertured at their upper ends at 16 for receiving and securing the horizontally arranged stud shafts 17 upon which the rollers 18 are journaled.

Said rollers have inwardly tapered surfaces 19 adapted for cooperative engagement with the I beam tapered flanges 12 upon opposite sides of said beam. It is apparent that the movable portion of the conveyor mechanism is arranged upon opposite sides of I beam 11 and is adapted for longitudinal movement along the tapered flanges 12, as shown in Fig. 1. The shafts 17 are secured upon the upper ends of arms 14 and 15 by the nuts 20'.

Upright arms 14 and 15 intermediate their upper and lower ends have central portions which terminate in the transverse laterally directed tapered half circular bosses 24 and 25 respectively, the exterior surfaces of which are threaded at 26 for threadedly receiving the corresponding interiorly tapered nuts 27 and 28.

By this construction it is apparent that the opposed cooperating arms 14 and 15 are secured to each other, with the registering half circular bosses 24 and 25 when assembled providing tapered threaded extensions of said arms 14 and 15 respectively for receiving the nuts 27 and 28.

Figure 2:
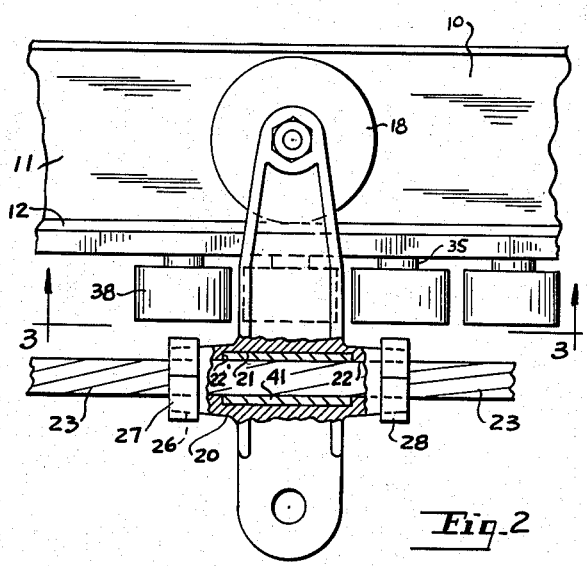
Fig. 2 is a side elevational view, partially broken away and sectioned, for illustration.

As shown in Figs. 1 and 2, the central portions 20 of the upright arms 14 and 15 are transversely apertured to receive therethrough the longitudinally movable cable element 23.

The central portions 20 of each of the arms 14 and 15 have formed therein the one-half cylindrical recesses 21, and these recesses terminate at their opposite ends in the one-half cylindrical recesses 22 formed within the threaded bosses 24 and 25 and which cooperatively receive and engage portions of cable element 23.

As viewed in Fig. 2, the half cylindrical recesses 21 are of a greater diameter than the recesses 22 to thereby provide shoulders 22' at opposite ends of recesses 21 to cooperatively retain the cylindrical sleeve 41 which is immovably secured to cable element 23. It is contemplated that any suitable means may be employed for immovably securing the sleeve 41 to cable element 23, such as by welding, by brazing, by crimping, by swedging, or equivalent methods.

By the arrangement of the sleeve 41 within recesses 21 in the central portion 20 of the arms 14 and 15, the cable may be secured to said arms when the tapered nuts 27 and 28 are threaded over the tapered bosses formed by the registering half circular portions 24 and 25 which extend from opposite sides of the arm central portions.

Below the central portion 20 of the arms 14 and 15, are a pair of spaced depending end portions 29 and 30 forming a part of the arms 14 and 15, which are transversely apertured at 31 and 32 for carrying a load which would depend from the above described conveyor mechanism in a conventional manner.

Upon the undersurface of I beam 11 throughout the curved portion 13 thereof and adjacent the opposite ends of said curved portion, there is secured a similarly curved bar 33, such as by the welds 34 shown in Fig. 1. It is understood that said bar could be secured in any other suitable fashion, such as by bolts for illustration. The upright bolts 35 with heads 36 at their lower end are threaded up into or otherwise secured to said bar. A bushing 37 is secured upon bolt 35 resting on the bolt head 36, and has rotatably journaled thereon the upright roller 38.

Consequently, there will be provided adjacent the curved portion 13 of beam 11 a plurality of such rollers 38 closely spaced to each other with their longitudinal axes at right angles to the bottom surface of the I beam 11, and with said rollers arranged intermediate the side edges of said I beam, as illustrated in Figs. 1 and 3.

Arms 14 and 15 upon their interior surfaces have the upright guide walls 39 and 40 formed therein, which are normally spaced slightly from the rollers 38, and are adapted for cooperation therewith as the conveyor moves along the curved portion 13 of I beam 11.

Not only will the rollers 38 in cooperation with guide walls 39 and 40 guide the movable portion of the conveyor mechanism around the curve 13 of I beam 11, but also said guide rollers will in effect substantially conform the longitudinal movable cable 23 to the shape of the curved portion 13 of I beam 11 to thereby eliminate the use of pulleys or other mechanism heretofore employed for this purpose.

It will be noted that the rollers 38 extend beyond the opposite ends of the curved portion 13 of said I beam in order to effectively lead the movable portion of the conveyor into and out of the curve. It is apparent that the guide rollers 38 are not required throughout the straight longitudinal portions of the I beam 11.

Rollers 38 not only guide the upright arms 14 and 15 around the curved portion 13 of the beam, but at the same time maintain the arm supporting rollers 18 upon I beam 11 spaced from the central web 19 of said I beam. By this construction the rollers 18 are prevented from rubbing against said web, which otherwise in a short time would cause the breakdown of the conveyor.

It is contemplated that the roller supporting bolts 35 could be otherwise secured to the undersurface of the I beam 11, such as by welding, in such a manner as would eliminate the arcuate bar 33.

Having described my invention, reference should now be had to the claims which follow for determining the scope thereof.

I claim:

1. In a conveyor movable along a horizontally curved beam, a pair of opposed substantially upright arms arranged upon opposite sides of said beam, rollers journaled upon the upper ends of said arms and riding upon the flanges on opposite sides of said beam, said arms intermediate their ends being transversely apertured to receive a longitudinally movable cable, means securing said cable to said arms, and a plurality of longitudinally spaced rollers loosely journaled upon an depending from the undersurface of said curved beam, cooperable with interior surface portions of said arms for guiding the arms along and around said curved beam and maintaining the position of the arm rollers on said beam spaced from its web.

2. In a conveyor movable along a horizontally curved beam, a pair of opposed substantially upright arms arranged upon opposite sides of said beam, rollers journaled upon the upper ends of said arms and riding upon the flanges on opposite sides of said beam, said arms intermediate their ends being transversely apertured to receive a longitudinally movable cable, means securing said cable to said arms, and a plurality of longitudinally spaced rollers loosely journaled upon and depending from the undersurface of said curved beam, said arms having opposed upright flat interior walls arranged upon opposite sides of said depending rollers and cooperable therewith for guiding the arms along and around said curved beam and maintaining the position of the arm rollers on said beam spaced from its web.

3. In a conveyor movable along a horizontally curved beam, a pair of opposed substantially upright arms arranged upon opposite sides of said beam, rollers journaled upon the upper ends of said arms and riding upon the flanges on opposite sides of said beam, said arms intermediate their ends being transversely apertured to receive a longitudinally movable cable, means securing said cable to said arms, a plurality of longitudinally spaced upright studs joined to and depending from central portions of the undersurface of said beam, a roller journaled and supported on each of said studs cooperable with interior surface portions of said arms for guiding the arms along and around said curved beam and maintaining the position of the arm rollers on said beam spaced from its web.

4. In a conveyor movable along a horizontally curved beam, a pair of opposed substantially upright arms arranged upon opposite sides of said beam, rollers journaled upon the upper ends of said arms and riding upon the flanges on opposite sides of said beam, said arms intermediate their ends being transversely apertured to receive a longitudinally movable cable, means securing said cable to said arms, an elongated bar joined to and depending from the central portion of the undersurface of said beam, upright studs secured to and depending from said bar, and a roller journaled and supported on each of said studs cooperable with interior surface portions of said arms for guiding the arms along and around said curved beam and maintaining the position of the arm rollers on said beam spaced from its web.

5. In a conveyor movable along a horizontally curved beam, a pair of opposed substantially upright arms arranged upon opposite sides of said beam, rollers journaled upon the upper ends of said arms and riding upon the flanges on opposite sides of said beam, said arms intermediate their ends being transversely apertured to receive a longitudinally movable cable, a plurality of longitudinally spaced rollers loosely journaled upon and depending from the undersurface of said curved beam, cooperable with interior surface portions of said arms for guiding the arms along and around said curved beam and maintaining the position of the arm rollers on said beam spaced from its web, said arms intermediate their ends each having a pair of outwardly directed laterally extending half circular tapered threaded elements, which when in registry form threaded bosses, and nuts engaging said bosses securing said arms together and said cable therebetween.

LEO T. DAIGLE.

References Cited in the file of this patent

UNITED STATES PATENTS

| Number | Name | Date |
| --- | --- | --- |
| 1,492,569 | McBride | May 6, 1924 |
| 1,810,416 | Francis | June 16, 1931 |
| 2,517,444 | Rousseau | Aug. 1, 1950 |
| 2,604,974 | Daigle | July 29, 1952 |
| 2,633,226 | Vogt | Mar. 31, 1953 |